(12) United States Patent
Djaparidze

(10) Patent No.: US 6,779,037 B1
(45) Date of Patent: Aug. 17, 2004

(54) METHOD OF OBTAINING OPTIMUM USE OF A SHARED TRANSMISSION MEDIUM FOR MULTIMEDIA TRAFFIC

(76) Inventor: Levan Roberto Djaparidze, Zapata 476, 4th Floor, Dept. 21, (1426) Buenos Aires (AR)

(*) Notice: Subject to any disclaimer, the term of this patent is extended or adjusted under 35 U.S.C. 154(b) by 0 days.

(21) Appl. No.: 09/407,586

(22) Filed: Sep. 28, 1999

(51) Int. Cl.[7] .............................. H04B 3/40; G08C 15/00
(52) U.S. Cl. ......................... 709/238; 709/223; 702/2; 702/179; 703/2; 370/7; 370/230
(58) Field of Search ................................ 709/223, 224, 709/238; 702/179, 180, 181; 703/2; 370/17, 230

(56) References Cited

U.S. PATENT DOCUMENTS

| | | | | |
|---|---|---|---|---|
| 5,583,792 A | * | 12/1996 | Li et al. ...................... | 364/514 |
| 5,604,731 A | * | 2/1997 | Grosslauser et al. ........ | 370/232 |
| 5,757,771 A | * | 5/1998 | Li et al. ...................... | 370/235 |
| 5,774,455 A | * | 6/1998 | Kawase et al. .............. | 370/232 |
| 5,886,907 A | * | 3/1999 | Abu-Amara et al. ........ | 364/578 |

OTHER PUBLICATIONS

Skelly, Paul; Schwartz, Mischa; Dixit, Sudhir. "A Histogram–Based Model for Video Traffic Behavior in an ATM Mulitiplexer." IEEE/ACM Transaction on Networking. vol. 1, No. 4, Aug. 1993. pp. 446–458.*

Lau, Wing–Cheong; Li, San–qi. "Statistical Multiplexing and Buffer Sharing in Multimedia High–Speed Networks: A Frequency–Domain Perspective." IEEE/ACM Transactions on Networking, vol. 5, No. 3, Jun. 1997. pp 382–396.*

Shroff, Ness B.; Schwartz, Mischa. "Improved Loss Calculatons at an ATM Multiplexer," IEEE/ACM Transactions on Networking, vol. 6, No. 4, Aug. 1998. pp. 411–420.*

Skelly, Paul; Schwartz, Mischa; Dixit, Sudhir. "A Histogram–Based Model for Video Traffic Behavior in an ATM Multiplexer." IEEE/ACM Transaction on Networking. vol. 1, No. 4, Aug. 1993. pp. 446–458.*

Shen, Hong–Dah; and Li, San–qi. "Spectral Analysis of Packet Loss Rate at a Statistical Multiplexer for Multimedia Services." IEEE, 1993, pp. 1–27.*

* cited by examiner

*Primary Examiner*—David Wiley
*Assistant Examiner*—Alina Boutah
(74) *Attorney, Agent, or Firm*—Fay, Sharpe, Fagan, Minnich & McKee, LLP

(57) ABSTRACT

A method for obtaining optimum utilization of a shared transmission medium for multimedia traffic, complying with the customer Quality of Service (QoS) requirements of the traffic sessions through the transmission medium whereby the maximum accepted losses of data packets and maximum accepted transmission delays are met, the method comprising constructing a complete histogram containing the arrivals of data units for each type of a plurality of sessions, the histogram representing the arrivals of data units per a predetermined interval of time; making a convolution of the values from the histograms representing said sessions to estimate an aggregated histogram comprising the arrivals from the plurality of sessions; estimating the probability of loosing some data units of the whole sessions, and adjusting at least one of the bit rate and transmission delay to get the optimum transmission media utilization.

15 Claims, 2 Drawing Sheets

METHOD OF OBTAINING OPTIMUM USE OF A SHARED TRANSMISSION MEDIUM FOR MULTIMEDIA TRAFFIC

BACKGROUND OF THE INVENTION

1. Field of the Invention

The present invention relates to the field of the communications, preferably aggregate multimedia traffic, and more particularly the invention refers to a method for obtaining optimum utilization of a shared transmission medium for multimedia traffic, complying with customer quality standards for the traffic sessions. More particularly the invention refers to a technique for estimating the transmission rate necessary to satisfy the quality of service (QoS) requirements, in a plurality of real-time variable bit rate (rt-VBR) sessions, thus preventing the transmission medium capacity from being underestimated or overestimated this prevention resulting in an optimum cost rating of the transmission service.

2. Description of the Prior Art

A general multimedia transmission is established between a sender and a recipient and is made through a shared transmission medium, such as a communication network, more particularly in a ATM network having a predetermined transmission rate capacity or bandwidth for transmitting the ATM cells or data packets. It may be however that the bandwidth available for transmission is not enough to new calls or requests for connection, and such request exceeding the capacity of the network are rejected or queued until bandwidth availability is re-established. This availability, however, is estimated on the basis of real-time measurements or based on previously stored data transmission rate information. These measurements involves the calls in progress in the network, the new calls, requests for connection, frequency and duration of data bursts, data peaks, sojourn times, average usage, etc. In any event, the measurements of such parameters are complex, cumbersome and time consuming to make, even with the most recent and developed computer technology.

The data transmissions involving interactive voice conversations and videoconferences through modern networks must comply with the Quality of Service (QoS) requirements and the availability of the network must be constantly evaluated to comply with such requirements. Thus, a new rt-VBR session should be accepted provided that the network does not fail to comply with the QoS requirements. The QoS requirements can be defined by the Cell Lost Ratio (CLR), i.e. it is related to the probability of loosing a data unit or cell within a unit time or interval, defined to evaluate the traffic. The CLR is the ratio between the number of emitted cells according to contract rules that do not reach the receptor in time vs. the total number of cells emitted according to the contract rules; this is normally estimated in time periods that are larger than the duration of a call or connection. The QoS is also determined by the maximum time between the output of the signal from the transmitter and the reception thereof at the receptor, this being called Maximum Cell Transfer Delay or maxCTD. The services with CLR=0 are called deterministic services and the services with CLR>0 are called predictive services.

In agreement to ITU-T G.114, when the maximum end-to-end delay imposed by the application is less than 400 msec and the traffic type generated by the coder is variable bit rate (VBR), the application is called rt-VBR. Re-transmissions are not accepted by applications rt-VBR to correct transmissions errors or cell looses because the re-transmitted cell delay generally exceeds the maxCTD.

The total delay since a signal is captured by the transmitter until is reproduced at the receptor is the result of several delay components typically summarized as follows:

$$maxCTD > Codification + Propagation + Queuing$$

The maxCTD required by sessions imposes a maximum to total delay.

Queuing delay is the delay that a cell has in the queue of the system, is a random variable T depending of the service discipline, of A (i.e. quantity and type of traffic) and of r (transmission rate or speed reserved for the traffic A in the channel). The quantity of cells in the queue is a random variable Q, and the above variables, in their form for discrete time, may be related with a recursive formula by the equation:

$$Q[n] = (Q[n-1] + A[n] - r)^+ \qquad (1)$$

where operator $<X>^+ = \max(X, 0)$, and the queuing delay may be calculated by $$T[k] = Q[n]/r$$

wherein:

n number of interval.

A[n]=amount of data units arrived during interval n.

Q[n]=amount of data units in queue during interval n.

r=transmission rate reserved for traffic A.

T[n]=queuing delay experimented by data units arrived in interval n.

k and n are the same if T is evaluated for A[n]>=0, and k<=n when T is evaluated only when A[n]>0.

The channel utilization is defined as $$u = \frac{E\{A\}}{r},$$

where $E\{A\}$ is the traffic average, and $E\{A\} < r$ must hold for system stability.

Generally, there are no analytical solutions for equation (1) because traffic A is an unknown stochastic process, and the conventional solutions are based in the construction of mathematical models of the traffic which do not reflect the exact behavior of the traffic.

There are several processes for modeling the traffic such as the Markov Modulated Poisson Process (MMPP) which is used for solving the queuing process. This process however requires of an extremely large quantity of samples that cause the processes to be no practical.

Another drawback is the estimation of the process parameters, wherein the mean bite rate (MBR) not only depends on the algorithm coding the session but also on the participants in a conversation and the type of conversation. There are predictive methods characterizing the traffic with a Probabilistic Burstiness Curve (PBC) using excessive quantity of actual samples.

U.S. Pat. No. 5,886,907 to Abu-Amara et al. discloses a method and system to model aggregate multimedia traffic in an ATM network with a purpose of constructing and utilizing a network. Different traffic services are specified and quality for each service is determined from available standards. Sojourn times are determined on the basis of measurements or published standards. The '907 patent is based in the determination of values for average and mean sojourn times, usage rate for each type of service for modeling the traffic.

U.S. Pat. No. 5,583,792 to San-Qi Li discloses a technique for the integration of traffic measurement and queue analysis comprising basically traffic measurement, statistical matching and queuing analysis. The traffic measurement is made by standard signal processing techniques, the statistical matching is made by constructing a Markov chain modulated rate process that can statistically match with each given traffic stream, and the queuing analysis is made by a folding-algorithm to determine a design of the network.

U.S. Pat. No. 5,604,731 to M. Grossglauser discloses a method of renegotiating transmission rates between a sender and a recipient in a renegotiated variable bit-rate (RVBR) network or a renegotiated constant bit-rate (RCBR) network, based on previously stored data transmission rate information. The method needs to count on previously stored information or new information about the real-time transmission must be obtained.

U.S. Pat. No. 5,757,771 to Kwok-Leung, Li discloses a method of processing data packets received from a data input port, temporarily stored in a buffer memory and transmitting the data packets to an output port, wherein the buffer memory is divided into a plurality of data sub-queues having assigned output rankings, an accumulation ratio threshold being calculated for each data sub-queue, and said transmission of data packets to the output port is made in accordance with said accumulation ratio threshold and said output ranking.

U.S. Pat. No. 5,774,455 to Fumiyoshi Kawase discloses a digital data transmission apparatus including a digital data buffer, a digital data transmitter and a controller for controlling a transmission rate which is an amount of data output per a unit time by the digital data transmitter, for increasing the transmission rate.

In all of the above methods, techniques and apparatii, the quantity of sampled values to obtain a reliable result is so huge that the estimation process is not practicable and, to be put in practice, the quantity of measurements must be dramatically reduced at such an extent that the results are not reliable. In other words, the prior art estimates Packet Loss Rates, which needs of a large quantity of samples and computing time. The large quantity of samples is necessary because the estimated probabilities are low.

While there are some methods that use lesser samples to identify the parameters of models, the obtained models do not accurately reflect the traffic behavior.

On the other hand, the methods that are based on the use of a small amount of samples usually fail to estimate PLR for relevant ranges of QoS requirements and channel utilization.

It would be therefore convenient to have a new technique or method that allows to obtain accurate, relevant and reliable estimations with few samples to be obtained either from a traffic model or from a real-time traffic.

SUMMARY OF THE INVENTION

It is therefore one object of the present invention to provide a new method of estimating the probability of loosing a data cell during calls in progress, called Cell Loss Ratio (CLR) and, particularly for estimating the probability of loosing a data unit or data packet, which may be called Packet Loss Rate (PLR), during a multimedia transmission traffic, such as a telephonic conversation or a video conference.

It is still another object of the present invention to provide a method for obtaining optimum utilization of a shared transmission medium for multimedia traffic, complying with the customer QoS parameters for traffic sessions through the transmission medium whereby the maximum accepted looses of data packets and maximum accepted transmission delays are met, the method comprising constructing an histogram containing the arrivals of data units for each type of a plurality of sessions, the histogram representing the arrivals of data units per interval of time; making a convolution of the values from the histograms representing said sessions to estimate an aggregated histogram comprising the arrivals from the plurality of sessions; estimating the probability of loosing some data unit of the whole sessions, and adjusting at least one of the bit rate and transmission delay to get the optimum transmission media utilization. While the bit rate reserved for the sessions may be adjusted as mentioned above the QoS parameters may also be renegotiated.

It is a further object of the present invention to provide a method for obtaining optimum utilization of a shared transmission medium for multimedia traffic, complying with the customer QoS parameters for sessions through the transmission medium whereby the maximum accepted looses of data packets and maximum accepted transmission delays are met, the method comprising receiving real traffic data; constructing an histogram containing the arrivals of data units per time unit for each type of a plurality of sessions, making a convolution of the values from the histograms to determine an aggregated histogram comprising the arrivals from the plurality of sessions; estimating the probability of loosing some data unit of the whole sessions, and inputting the received data when the estimated probability is below a predetermined probability value and rejecting the received data when the estimated probability is above the predetermined probability value.

It is still a further object of the present invention to provide a method of estimating the probability of loosing data during calls in progress, particularly data packets, namely Packet Loss Rate (PLR), during a multimedia transmission traffic, the estimation being useful for constructing a transmission network by sizing the network, defining the necessary transmission speed or rate, for example, and for pricing and/or billing the services, such as telephonic conversation or video conference services.

It is also an object of the present invention to provide a method for obtaining optimum utilization of a shared processor where process are served, complying with the customer QoS requirements, through the processor whereby the maximum accepted processing delay time and probability of exceeding the maximum accepted processing delay time are met, the method comprising:

constructing an histogram containing the arrivals of processing times for each one of a plurality of sessions, the histogram representing the arrivals of processing times per interval of time;

making a convolution of the values from the histograms representing said sessions to estimate an aggregated histogram comprising the arrivals from the plurality of sessions;

estimating the probability of exceeding the maximum processing delay time of the whole sessions, and adjusting at least one of the processing rate reserved for the sessions, the maximum processing delay time and the probability of exceeding the maximum processing delay time.

The above and other objects, features and advantages of this invention will be better understood when taken in connection with the accompanying drawings and description.

BRIEF DESCRIPTION OF THE DRAWINGS

The present invention is illustrated by way of example in the following drawings wherein.

Each curve of dotted (:) lines corresponds to a different estimation of PLR for the aggregated traffic made with a conventional queuing process using arrivals of 100,000 intervals drawn from the aggregated traffic.

Each curve of dashed (-) lines corresponds to a different estimation of PLR for the aggregated traffic made with an aggregated histogram calculated by convoluting eight times an individual histogram constructed with arrivals of just 10,000 intervals drawn from any of the eight sessions.

DESCRIPTION OF THE PREFERRED EMBODIMENTS

As stated above, the data transmissions must comply with the Quality of Service (QoS) requirements and the availability of the network must be evaluated to comply with such QoS. By means of the method of the invention the rt-VBR sessions are characterized or evaluated in real-time with just a few samples and in a short time as compared to the prior art techniques. In accordance to the invention, such data units or packets affected by a delay in excess of the Maximum Cell Transfer Delay or maxCTD are considered to be lost. According to the invention the PLR is correctly estimated to accurately determine the quantity of sessions that can share a transmission channel always complying with the QoS requirements. To this purpose a lower threshold of the PLR using the PBC for aggregate sessions is obtained with few samples. This low threshold is calculated from an aggregated histogram calculated by convoluting the individual histograms constructed with arrivals from each type of session, and the convolution is preferably made by using Fast Fourier Transform (FFT).

Figure 1:
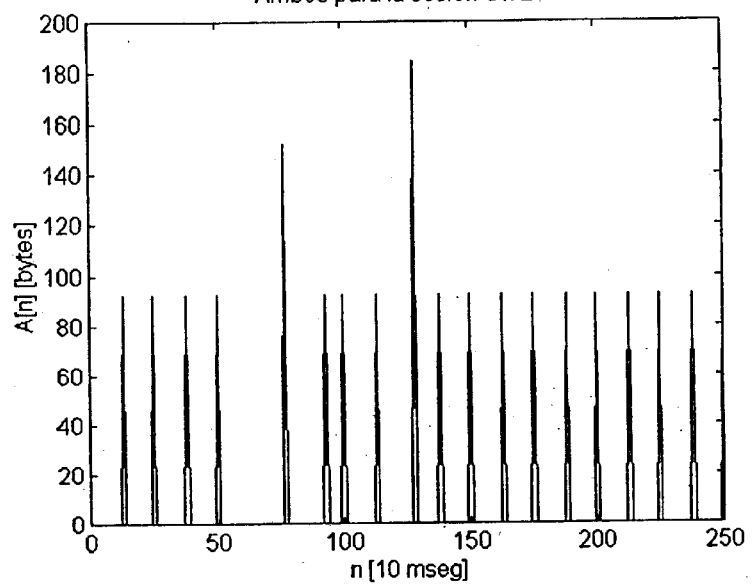
FIG. 1 is a graph showing the arrivals (in bytes) measured over 250 intervals of 10 msec., taken from a session generated by a person holding a telephone conversation (coded by protocol G.723), during 54 minutes approximately.

To analyze the traffic the arrivals are taken for determined unit time, for example the arrivals in 2.5 seconds (e.g. 250 intervals of 10 msec.) of traffic samples generated by a coder G.723 are illustrated in FIG. 1. According to the invention all the bytes that reach the receptor with a delay exceeding the maxCTD are considered as being lost, and particularly the entire packet or block of which the lost byte is part of is considered as being lost. The packet or block is the number of bytes arrived in the same interval.

With the arrivals obtained as indicated in FIG. 1 a histogram is constructed from arrivals of one session, thus several histograms may be obtained each one for each desired type of session. The intervals of time for which the arrivals are measured may be constant or nearly constant.

The process according to the invention will be now described in one of the embodiments thereof:

Let $A_x[n]$ be the number of data units of session $S_x$ arrived in time interval n, with n ranging from 1 to N, and let $$C_x^m[n] = \sum_{i=n-m-1}^{n} A_x[i] \text{ with } A_x[n] \geq 0, m \geq 1 \qquad (2)$$

be the number of data units arrived in the m time intervals before and including interval number n, where N is the amount of intervals considered to build the histogram.

Let $P_x(m,k)$ be the number of times that $C_x^m[n]=k$ with n ranging from 1 to N.

A row vector $P_x(m,1 \ldots K)$ is a regular histogram of random variable $C_x^m$, where $C_x^m[n]$ is a sample of variable $C_x^m$.

A complete histogram of session $S_x$ is a matrix $P_x$, with elements $P_x(m,k)$, where m indexes rows and k indexes columns. $P_x(m,k)$ estimates $\Pr\{C_x^m = k\}$, namely the probability that k data units of session type $S_x$ arrive in m time intervals.

Index m ranges from 1 to M, and indicates the number of intervals over which arrivals are summed, and k ranges from 0 to K and indicates numbers of data units arrived in m intervals.

Before going any further it may be important to demonstrate that M and K exist and they are lower than ∞:

the traffic is assumed $$\exists C_x = \max(C_x^1)/A_x[n] \leq C_x, n \geq 0 \qquad (3)$$

this hypothesis being valid for all real encoders, but no for ideal traffic models like the M/M/1 (Markov/Markov/1) or fBm (fractional Brownian motion).

Under condition (3) it may be assured that:

$$\forall M, \exists r_M / \max(C_x^m) \leq m \cdot r_M \text{ for } m > M$$

that is, for each amount of time intervals M, is possible to find a speed in the channel $r_M$ so that the arrivals in m intervals (with m>M) never exceed the transmission capacity of the channel for those intervals.

This is:

$$\Pr(C_x^m > m \cdot r_M) = 0 \text{ for } m > M.$$

Since the PLR should be estimated for rates r larger than $r_M$ (i.e. channel utilization lower than $E\{A_x\}/r_M$), then a finite number M of rows is enough to construct the complete histogram.

And since K can be designed as $C_x^m$, then the amount of columns necessary to construct the histogram is also finite.

Let $A[n]=A_x[n]+A_y[n]$ be the aggregated traffic obtained by aggregating sessions $S_x$ and $S_y$. wherein $A_x, A_y, A_z$, etc. are traffics of different types of sessions. If $\Pr\{C_x^m\}$ is the probability distribution of random variable $C_x^m$ and $\Pr\{C_y^m\}$ is the probability distribution of random variable $C_y^m$, then using standard assumption that $A_x$ and $A_y$ are independent, the following equation is verified:

$$\Pr\{C^m\} = \Pr\{C_x^m\} \otimes \Pr\{C_y^m\}, \qquad (4)$$

wherein:

$\Pr\{C^m\}$ is the probability distribution of random variable $C^m$, namely the arrivals of aggregated traffic A.

It is clear from any person skilled in the art that the expression (4) may be extended to:

$$\Pr\{C^m\} = \Pr\{C_x^m\} \otimes \Pr\{C_y^m\} \otimes \ldots \otimes \Pr\{C_z^m\}$$

wherein x, y, z: index to different types of sessions,

Lets also assume as an example that 2 sessions of type x and 3 sessions of type y are aggregated, then equation (4) can be written as follows:

$$\Pr\{C^m\} = \Pr\{C_x^m\} \otimes \Pr\{C_x^m\} \otimes \Pr\{C_y^m\} \otimes \Pr\{C_y^m\} \otimes \Pr\{C_y^m\},$$

Let $P_x$ be the matrix representing a histogram for session type $S_x$, and $P_y$ the matrix for session type $S_y$. Matrix P constructed by performing row by row convolution of matrixes $P_x$ and $P_y$, has elements P(m,k) that estimates Pr{$C^m$=k} for aggregated traffic A.

The matrix convolution may be performed by (DTFT) Discrete Time Fourier Transform.

Figure 2:
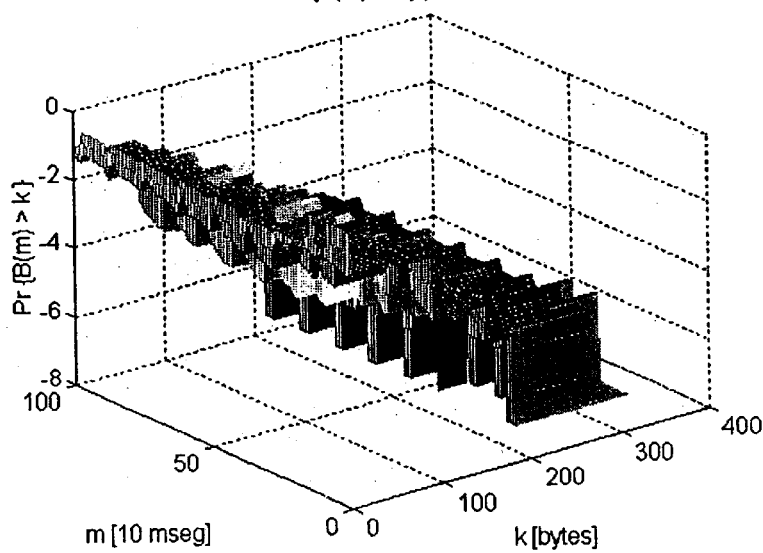
FIG. 2 shows an exemplary histogram of the Probabilistic Burstiness Curve (PBC) (i.e. $\Pr\{B^m > k\}$) for session G.723.

By subjecting the values of the histograms (of each type of sessions) to a convolution operation performed row by row, an aggregated histogram "similar" to the one illustrated in FIG. 2 is obtained for a desired number of sessions, eight sessions for example.

Figure 3:
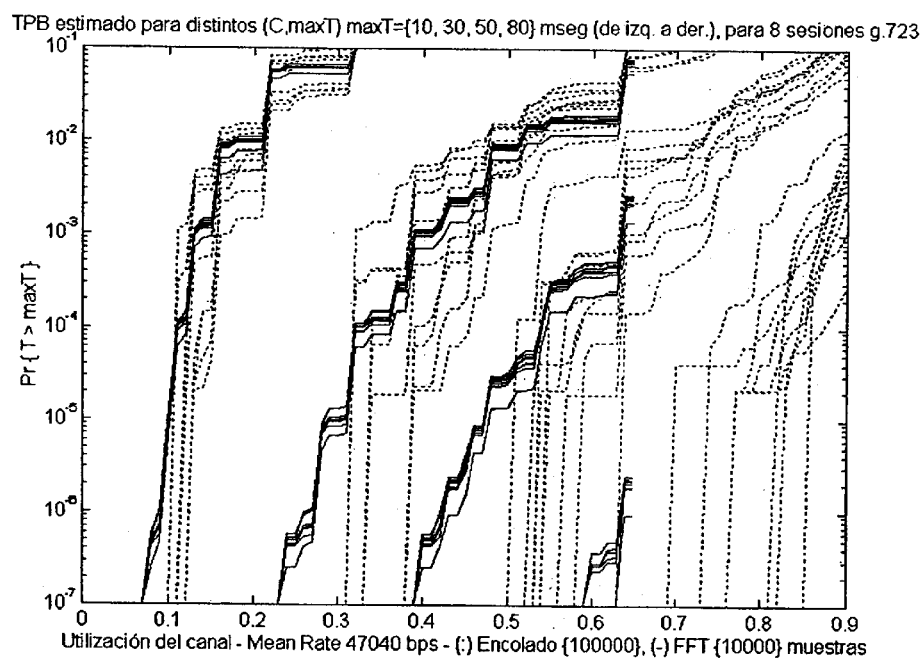
FIG. 3 shows several estimations of Packet Loss Rate (PLR) curves for the traffic generated by eight aggregated sessions. All sessions being of the same type.

Then an estimator of probabilities is constructed using the Probabilities Burstiness Curve PBC as shown in FIG. 3.

The lower threshold for the Packet Loss Rate is calculated by:

$$Pr\{T > t | r, A\} \geq \max_{M \geq m \geq 1} \left( \frac{Pr\{C^m > r(t+m-1)\}}{Pr\{C^1 > 0\}} \right) \quad (5)$$

wherein:

Pr{T>t|r, A}=Packet Loss Rate: Probability of data units of aggregated traffic A waiting more than t intervals if rate r is reserved for traffic A.

T=Random variable queuing delay.

t=Amount of time intervals.

M=Maximum value of m.

Pr{$C^m$>r(t+m−1)}=Probability estimated using the matrix P.

$C^m$=Random variable defined in 1.2.

r=Rate of transmission speed reserved or assigned to traffic A.

m=Number of time intervals over which arrivals are summed.

$C^1$=$C^m$ with m=1.

Fig. 3 shows the curves drafted with different PLR estimations made by the conventional queuing technique and indicated by dotted (..) lines and different PLR estimations obtained on the basis of equation (5) and illustrated by dashed (-) lines. It may be seen from FIG. 3 that the PLR estimations made through direct queuing of 100,000 samples (i.e. 1000 seconds) drawn from the aggregated traffic in the channel have a remarked variation and a particularly poor performance for low PLRs. On the contrary, the estimations (dashed lines) made by convolutioning the individual histograms constructed with just 10,000 samples (i.e. 100 seconds) of only one of the eight sessions have relative low variation and allow one to estimate very low PRLs.

The lower threshold calculated in (5) may be alternatively calculated by:

$$Pr\{T > t | r, A\} \geq \max_{M > m \geq 1} (Pr\{C^m > r(t+m-1)\}).$$

In the event that only one session is evaluated÷, the lower threshold may be also calculated by:

$$Pr\{T > t | r, A\} \geq \max_{M \geq m \geq 1} (Pr\{B^m > r(t+m-1)\})$$

wherein $B^m$ are the data units arrived in the m intervals before the interval n, also including the interval n. $B^m$ is defined by:

$$B_j^m B^m[j] = \sum_{i=n-m+1,}^{n} A[i] \text{ con } A[n] > 0, m \geq 1$$

wherein:

j=counter for the times A[n] is >0.

It means that the samples of random variable $B^m$ are taken only when A[n]>0.

It is easy to see that if for all n, A[n]>0, then $B^m$=$C^m$.

Concluding, the method of the present invention for estimating the Packet Loss Rate (PLR) of FIG. 3 is more affective and accurate, with less samples required for obtaining the curves as compared to the estimation of the PLR by using the conventional techniques of direct queuing of the samples, when many sessions are multiplexed.

One of the advantages of the present method is that it is carried out faster than the direct queuing because fewer samples are necessary for making an estimation with acceptable variation.

Another advantage is that the method is readily carried out through faster computer operations and the FFT is made only on the rows of the histograms matrix as well as the convolution is carried out by multiplying the rows in the transformed field.

Another advantage is that estimations are made within ranges of Packet Loss Rate (PLR), channel utilization, and transfer delay which are relevant for real sessions and users requirements in actual telecommunications networks.

While preferred embodiments of the present invention have been illustrated and described, it will be obvious to those skilled in the art that various changes and modifications may be made therein without departing from the scope of the invention as defined in the appended claims. For example, the histogram for each session may be a model containing average values taken from a bit rate real-time session.

Alternatively the histogram containing the values of the data units per period of time of each session may be constructed by measuring the arrivals on line in real time bit rate sessions.

In addition, the sessions may be constant bit rate sessions or variable bit rate sessions.

It is also to be remarked that the method of the invention is applicable and is helpful in the use of queuing techniques, for example by optimizing the attention to clients acceding to a server looking for a service thereof, or by constructing and sizing the server processor. In this application the processor is the shared transmission or processing medium.

While preferred embodiments of the present invention have been illustrated and described, it will be obvious to those skilled in the art that various changes and modifications may be made therein without departing from the scope of the invention as defined in the appended claims.

I claim:

1. A method for obtaining optimum utilization of a shared transmission medium for multimedia traffic, complying with the customer QoS requirements for any type of the traffic sessions through the transmission medium whereby the maximum accepted losses of data packets and maximum accepted transmission delays are met, the method comprising:

constructing a complete histogram for each type of a plurality of sessions, wherein each complete histogram comprises a plurality of regular histograms, each regular histogram being constructed by counting data units arrivals in a number of time intervals, the number of time intervals being different for each regular histogram;

making a convolution of values from the complete histograms representing said sessions to estimate an aggregated histogram comprising the data units arrivals from the plurality of sessions;

estimating the probability of loosing some data units of the whole sessions, and adjusting at least one of the bit rate reserved for the sessions, the packet loss rate PLR and the transmission delay.

2. The method of claim 1, wherein the intervals of time for which the data units arrivals are measured are constant or nearly constant.

3. The method of claim 1, wherein the complete histogram for each session is a model containing average values taken from a bit rate real-time session.

4. The method of claim 1, wherein the sessions are constant bit rate sessions.

5. The method of claim 1, wherein the sessions are variable bit rate sessions.

6. The method of claim 1, wherein the complete histogram containing the values of the data units per interval of time of each session is constructed by measuring the arrivals on line in real time bit rate sessions.

7. The method of claim 1, wherein the complete histogram containing the values of data units per interval of time of each session, only contains the values corresponding to the arrivals of data units >0.

8. The method of claim 1, wherein the complete histogram containing the values of data units per interval of time of each session, contains the values corresponding to the arrivals of data units $\geq 0$.

9. The method of claim 1, further including:

estimating a lower threshold for the packet loss rate PLR as a function of the estimated probability using an equation $$Pr\{T > t \mid r, A\} \geq \max_{M \geq m \geq 1} \left( \frac{Pr\{C^m > r(t+m-1)\}}{Pr\{C^1 > 0\}} \right).$$

10. The method of claim 1, further including:

estimating a lower threshold for the packet loss rate PLR as a function of the estimated probability using an equation $$Pr\{T > t \mid r, A\} \geq \max_{M \geq m \geq 1} (Pr\{C^m > r(t+m-1)\}).$$

11. The method as set forth in claim 1, wherein the transmission delay substantially comprises queuing delay, propagation delay and coding delay, the queuing delay being equal to or less than 80 msec.

12. The method as set forth in claim 1, wherein the packet loss rate PLR is equal or less than $10^{-6}$.

13. The method as set forth in claim 1, wherein the each regular histogram is constructed with 10,000 samples or less.

14. A method for obtaining optimum utilization of a shared transmission medium for multimedia traffic, complying with the customer QoS requirements for the sessions through the transmission medium whereby the maximum accepted losses of data packets and maximum accepted transmission delays are met, the method comprising:

receiving real traffic data;

constructing a complete histogram for each type of a plurality of sessions, wherein each complete histogram comprises a plurality of regular histograms, each regular histogram being constructed by counting data units arrivals in a number of time intervals, the number of time intervals being different for each regular histogram;

making a convolution of values from the complete histograms to determine an aggregated histogram comprising the data units arrivals from the plurality of sessions;

estimating a probability of loosing some data units of the whole sessions, and inputting the received data when the estimated probability is below a predetermined probability and rejecting the received data when the estimated probability is above the predetermined probability.

15. A method for obtaining optimum utilization of a shared processor where process are served, complying with the customer QoS requirements, through the processor whereby the maximum accepted processing delay time and probability of exceeding the maximum accepted processing delay time are met, the method comprising:

constructing a complete histogram for each one of a plurality of sessions, wherein each complete histogram comprises a plurality of regular histograms, each regular histogram being constructed by counting processing time units arrivals in a number of time intervals, the number of time intervals being different for each regular histogram;

making a convolution of values from the complete histograms representing said sessions to estimate an aggregated histogram comprising the time units arrivals from the plurality of sessions; and estimating a probability of exceeding the maximum processing delay time of the whole sessions, and adjusting at least one of a processing rate reserved for the sessions, the maximum processing delay time and the probability of exceeding the maximum processing delay time.

* * * * *

UNITED STATES PATENT AND TRADEMARK OFFICE
CERTIFICATE OF CORRECTION

| | |
|---|---|
| PATENT NO. | : 6,779,037 B1 |
| APPLICATION NO. | : 09/407586 |
| DATED | : August 17, 2004 |
| INVENTOR(S) | : Levan Roberto Djaparidze |

It is certified that error appears in the above-identified patent and that said Letters Patent is hereby corrected as shown below:

Claim 7 - The method of claim 1, wherein at least one of the complete histogram containing the values of data units per intervel of time of each session, only contains the values corresponding to the arrivals of the data units >0.

Claims 11-14 - cancel.

Signed and Sealed this

Twenty-ninth Day of August, 2006

JON W. DUDAS
*Director of the United States Patent and Trademark Office*